June 18, 1946.        A. F. JOHNSON        2,402,497
FLEXIBLE TUBING
Filed April 12, 1943
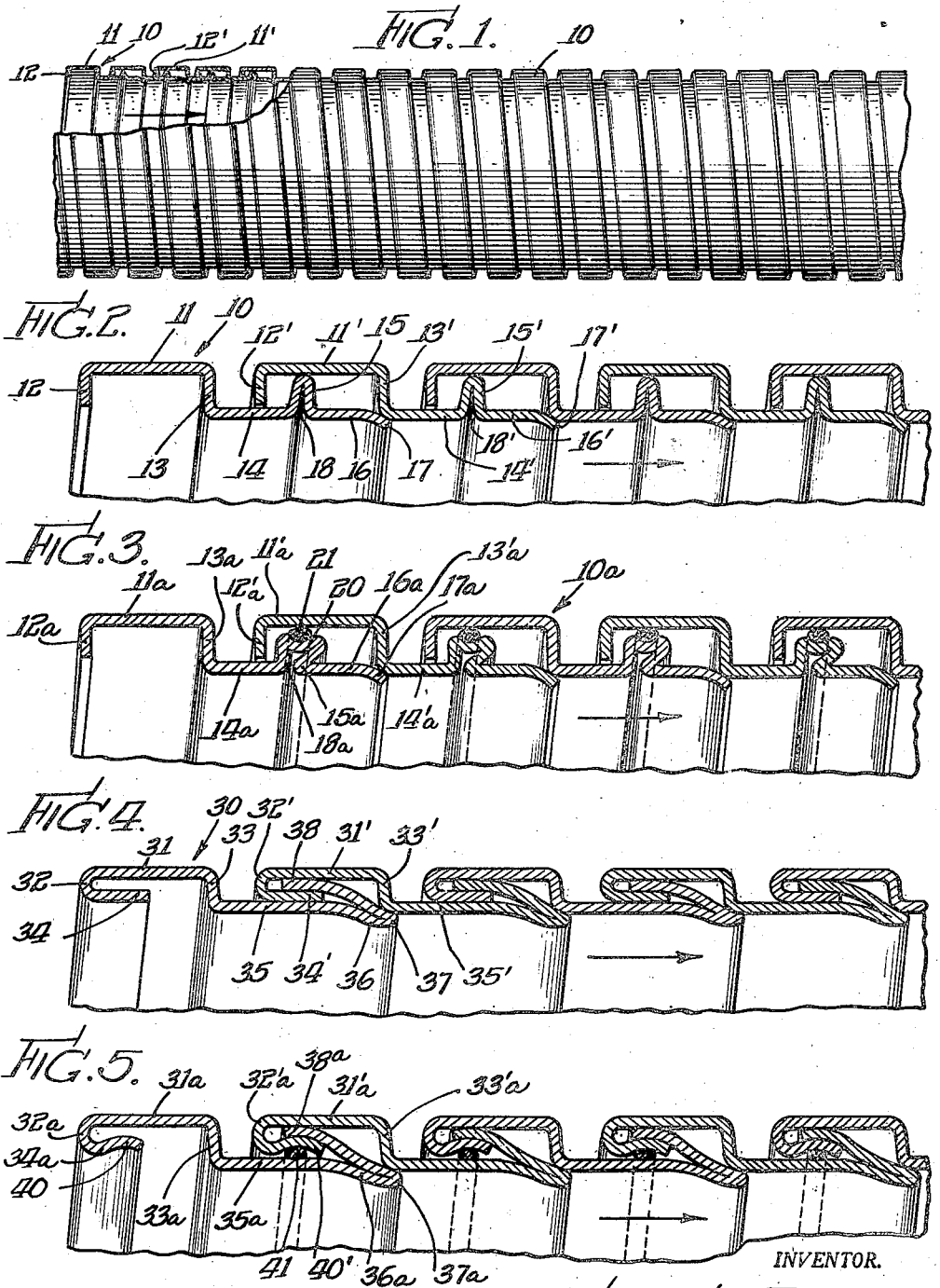
INVENTOR.
Axel Fredrick Johnson
By- Loftus, Moore, Olson & Trexler
attys.

Patented June 18, 1946

2,402,497

UNITED STATES PATENT OFFICE 2,402,497

FLEXIBLE TUBING

Axel Fredrick Johnson, Chicago, Ill., assignor to Chicago Metal Hose Corporation, Maywood, Ill., a corporation of Illinois Application April 12, 1943, Serial No. 482,716

3 Claims. (Cl. 138—50)

This invention relates to flexible tubing, and particularly to tubing of the spirally wound profiled strip type.

It is an object of the invention to provide an improved flexible tubing structure, and particularly to provide a flexible tubing structure having improved flow characteristics through which fluids either in the form of liquids or gases may be conducted and transmitted with a minimum of flow resistance.

More specifically stated, it is an object of the invention to provide a tubing structure of the spirally wound profiled strip type wherein the inner tubing bore is substantially continuous and unbroken, presenting a minimum of resistance to the transmission or flow of fluids therethrough.

Further objects of the invention are to provide a flexible tubing structure of the type stated, and having reduced resistance to fluid flow, but wherein the flexibility of the tubing is not impaired, and wherein packing may be used if desired to improve fluid tightness, and the interconnected strip edges may be interlocked in various ways, to meet the requirements of any particular installation.

Various other objects, advantages and features of the invention will be apparent from the following specification when taken in connection with the accompanying drawing wherein certain preferred embodiments of the invention are set forth for purposes of illustration.

In the drawing, wherein like reference numerals refer to like parts throughout:

Fig. 1 is a general elevational view, partly in section, of a flexible tubing structure constructed in accordance with and embodying the principles of the invention;

Fig. 2 is a detail sectional view, on an enlarged scale, more particularly illustrating the details of construction of the tubing structure shown in Fig. 1;

Fig. 3 is a view similar to Fig. 2, but showing a modified form of tubing structure incorporating a packing assembly for improved fluid tightness;

Fig. 4 is a view similar to Fig. 2, but illustrating a further modified embodiment wherein the tubing convolutions are of the more fully interlocked type; and Fig. 5 is a view, also similar to Fig. 2, but showing a fully interlocked type of tubing and also incorporating a packing element.

Referring more particularly to the drawing, and first to the embodiment illustrated in Figs. 1 and 2, a flexible tubing structure is illustrated formed from a spirally wound profiled metal strip 10, the juxtaposed edges of which are in interengaged locked relationship. Referring more particularly to Fig. 2, wherein the profiling of the metal strip is illustrated in detail, it will be seen that the strip 10 is provided with a longitudinally extending outer portion 11 terminating at one end in a radially inturned flange 12. The portion 11 is provided at its opposite end with a radially inturned flange 13, from the inner end of which a connecting strip portion 14 extends, projected longitudinally of the tubing structure, substantially parallel with the tubing axis.

The outer strip portion 11, together with the inturned flanges 12 and 13, provide an inwardly opening recess or cup-like structure. In accordance with the invention the connecting strip portion 14 is provided with means in locked engagement with this recess on the adjacent strip, and also with means bridging the gap in the recess whereby to provide a substantially smooth bore for the tubing. More specifically, referring to Fig. 2, a reversely bent outwardly projected radial flange 15 is provided on the connecting strip portion 14, said flange projecting into the recess formed by the portions 11', 12' and 13' of the adjacent strip, in locked engagement therewith. Extending from the reversely bent flange 15 is an end flange 16, projecting longitudinally of the tubing, substantially parallel to the tubing axis, and completely closing the recess 11'—12'—13', thus providing a substantially smooth hose bore structure. It will be noted that the locking flange 15 is relatively sharply reversely bent so that it provides substantially no opening or pocket into which fluids conducted through the tubing may be projected. The extreme end 17 of the end flange 16 is closely adjacent to the connecting strip portion 14' of the adjacent strip, and slightly underlies said portion, so that the flexing of the tubing is in no way impaired.

It will thus be seen that in accordance with the invention a flexible tubing structure is provided, specifically a tubing structure of the spirally wound profiled strip type, wherein the relatively large range of flexibility provided by tubing of this character is preserved, while at the same time a substantially continuous or unbroken inner tubing bore is provided, minimizing resistance to fluid flow through the tubing. In use, the tubing will preferably be so connected that the conducted fluids, whether in gaseous or liquid form, will be transmitted through the tubing in the direction of the arrows in Figs. 1 and 2, so that the slightly inturned ends 17 of the bridging flanges 16 provide a minimum impediment to fluid flow. Also, as stated, the reversely bent locking flange 15 provides only a relatively small opening as indicated at 18, so that in effect a substantially continuous and unbroken inner tubing bore is provided. In conventional tubing of this type the recess provided by the strip portions as indicated at 11'—12'—13' materially impedes the flow of fluids through the tubing by furnishing a pocket into which the fluids find their way as they are conducted through the tubing, setting up eddy currents in the fluid, restricting the free fluid flow, and in many instances causing an undesired and exorbitant pressure drop in the fluid flow through the conduit. In accordance with the present invention this recess is bridged by the flange 16 so that such restriction to flow is avoided.

The recess formed by the strip portions 11'—12'—13' is of considerable lateral extent with respect to the width of the reversely bent flange 15, thus providing a considerable margin of movement of the flange within the recess, permitting the relatively wide range of tubing flexibility. Due to the particular shaping of the bridging flange 16—17, with respect to the adjacent tubing strip portion 14', this relatively wide range of flexibility is in no way impaired, the flange portion 17 underlying the strip portion 14' so that while the parts in all positions of the tubing will be substantially in contacting relation, at the same time they may shift axially with respect to each other to accommodate the necessary tubing flexing movements.

The tubing may be fabricated by helically winding and interlocking the profiled strip in the manner conventionally employed in the manufacture of tubing of the general type shown, as will be readily understood. Also, it will be seen that standard end fittings, as used with this type of tubing, may be employed. The tubing may be used with or without an outer metal braid or covering, in accordance with the requirements of any particular installation.

In Fig. 3 a structural embodiment is illustrated, substantially similar to that shown in Fig. 2, but incorporating a packing element to improve fluid tightness. Similar reference numerals have been employed. More specifically, as shown in Fig. 3, the reversely bent flange, indicated by the reference numeral 15a, is in this instance provided at its outer portion with a groove, as indicated at 20 within which a packing member 21 is adapted to be engaged. This packing member, in the form shown, comprises an elongated cord of any suitable packing material, either metallic or non-metallic, spirally wound with a pitch corresponding to the pitch of the spirally wound profiled strip 10a. This packing element engages its trough seat 20 and the adjacent outer tubing portion 11'a, thus providing a seal between the edges of the spirally wound tubing strip. In certain instances a sealing or packing member such as shown in Fig. 3 may be desired, as where the conducted fluids are under some pressure or are of a type requiring that the escape of any of the fluid be avoided.

As shown in Fig. 3, it will be noted that while the flange 15a is shaped to provide a seat for the packing member 21, at the same time the inner edges of the reversely bent flange are substantially closed as indicated at 18a, similar to the arrangement of Fig. 2, thus providing a substantially smooth tubing bore for the transmission of the conducted fluids. It is believed that the manner of functioning and features of the structure of Fig. 3 will be otherwise clear, from what has heretofore been said with respect to Fig. 2.

In Fig. 4 an embodiment of the invention is illustrated, constructed in accordance with the principles of the invention, but wherein the interconnected strip edges are more fully interlocked, as may in certain instances be desired.

In this instance the metal strip 30, helically wound with its edges in interlocked engagement, as in the embodiments previously described, comprises an outer portion 31, similar in structure to the portion 11 of the tubing strip shown in Fig. 2. The outer portion 31 is bounded on one edge by a radially inwardly directed flange 32, and on the other edge by a radially inwardly directed flange 33. However, in this instance the flange 32 is provided with a longitudinally extending interlocking portion 34, arranged generally parallel to the axis of the tubing structure.

The flange 33 has at its inner end a connecting strip portion 35, similar in function and purpose to the connecting strip portion 14 in the structure of Fig. 2. As in the case of Fig. 2, this connecting strip portion is provided with means bridging the recess 31'—32'—33' formed in the adjacent strip edge, and with means interlocking with said recess. However, in Fig. 4 the strip is somewhat differently profiled to effect these functions. More specifically, the connecting strip portion 35 is initially provided with a sharply reversely bent flange 36 bridging the recess 31'—32'—33' and thus providing a substantially smooth bore for the tubing. The extreme end 37 of this flange underlies the adjacent connecting strip portion 35' in a manner similar to the end 17 of the strip structure of Fig. 2, whereby to preserve the flexibility of the tubing. From the reversely bent flange 36—37, the strip is extended to form an interlocking flange 38 which projects between the adjacent strip portions 31'—34', and is adapted to be interlocked therewith.

It will thus be seen that in the embodiment shown in Fig. 4, the connecting strip portion 35 is provided with means bridging the recess 31'—32'—33' in the adjacent tubing strip, thus providing a smooth bore tubing, and is also provided with a locking flange 38 having a radial component or extension, and adapted to interlock with the adjacent strip portions 31'—34', whereby to provide a more fully interlocked tubing structure as may in some instances be required or desirable. Due to the shaping of the flange 36—37, and the associated parts, the flexibility of the tubing is preserved. It is believed that the manner of fabrication of the structure illustrated in Fig. 4, and the manner of its functioning and operation, will be clear from what has heretofore been said in reference to the earlier described structural embodiments.

In Fig. 5 a still further structural embodiment of the invention is illustrated, similar to that shown in Fig. 4, but embodying a packing element to increase the fluid tightness of the tubing structure. Reference numerals similar to those employed in Fig. 4 have been used.

In this instance the tubing strip comprises an outer strip portion 31a terminating at one edge in a flange 32a and at its other edge in a flange 33a, similar to the structural embodiment shown in Fig. 4. However, in this instance the longitudinally projected extension 34a of the flange 32a is provided with a trough or seat portion 40 within which a flexible packing element, such as a cord or wire 41, is adapted to seat. This packing element has the purpose and function of the packing element 21 in the structural embodiment shown in Fig. 3, and may be of any desired material in accordance with the requirements of the particular installation. The packing element engages the seat portion of the longitudinally extended flange, such as indicated at 40', and also engages the surface of the connecting strip portion, as indicated at 35a, whereby to provide increased fluid tightness between the connected and interlocked strip edges.

The remaining portions of the strip, such as indicated at 36a, 37a and 38a may be similarly formed to the portions 36—37—38 of the structural embodiment shown in Fig. 4, and it is believed that the manner of fabrication and operation of the structure will be clear. In forming the tubing the profiled strip is helically wound and the edges interlocked as shown, the helically arranged packing element 41 being simultaneously introduced into and interfitted in the structure.

It is obvious that various changes may be made in the specific embodiments shown and described without departing from the spirit of the invention. Accordingly, the invention is not to be limited to the specific embodiments as shown and described, but only as indicated in the following claims.

The invention is hereby claimed as follows:

1. A flexible tubing comprising a helically wound strip having at one side an outwardly directed outer corrugation helically profiled and at the other side an inwardly directed inner corrugation having an outwardly directed interlocking portion fitting in the recess of the outer corrugation in the next adjacent spiral and a longitudinally directed recess-covering portion extending to the edge of the wall between the inner and outer corrugation of said next adjacent spiral to provide a smooth bore tubing.

2. A flexible tubing of the square-locked type comprising a helically wound strip having at one side an outwardly directed outer corrugation helically profiled and at the other side an inwardly directed inner corrugation having an outwardly directed annular flange portion fitting in the recess of the outer corrugation of the next adjacent spiral to interlock therewith and a longitudinally directed recess-covering free end portion extending to the edge of the wall between the inner and outer corrugations of said next adjacent spiral to provide a smooth bore tubing.

3. A flexible tubing of the interlocked type, said tubing comprising a helically wound strip having at one side an outwardly directed outer corrugation helically profiled and at the other side an inwardly directed inner corrugation having a longitudinally directed recess-covering portion extending to the edge of the wall between the inner and outer corrugations of the next adjacent spiral to provide a smooth bore tubing and a reversely bent and outwardly directed free end portion fitting in the recess of the outer corrugation of said next adjacent spiral to interlock therewith.

AXEL FREDRICK JOHNSON.